US010594980B2

(12) United States Patent
Hogan et al.

(10) Patent No.: US 10,594,980 B2
(45) **Date of Patent: *Mar. 17, 2020**

(54) SYSTEM AND METHOD FOR PROVIDING DIGITAL CONTENT

(71) Applicant: NBCUniversal Media, LLC, New York, NY (US)

(72) Inventors: Daniel Edward Hogan, Stamford, CT (US); Adam Greenbaum, New York, NY (US)

(73) Assignee: NBCUniversal Media, LLC, New York, NY (US)

( * ) Notice: Subject to any disclaimer, the term of this patent is extended or adjusted under 35 U.S.C. 154(b) by 1283 days.

This patent is subject to a terminal disclaimer.

(21) Appl. No.: 14/548,098

(22) Filed: Nov. 19, 2014

(65) Prior Publication Data

US 2015/0074714 A1 Mar. 12, 2015

Related U.S. Application Data

(63) Continuation of application No. 12/130,529, filed on May 30, 2008, now Pat. No. 8,990,673.

(51) Int. Cl.

| | |
|---|---|
| ***H04N 21/00*** | (2011.01) |
| ***H04N 7/16*** | (2011.01) |
| ***H04N 21/43*** | (2011.01) |
| ***H04N 21/433*** | (2011.01) |
| ***H04N 21/44*** | (2011.01) |
| ***H04N 21/81*** | (2011.01) |
| ***H04N 21/8547*** | (2011.01) |
| ***H04N 21/242*** | (2011.01) |
| ***H04L 29/06*** | (2006.01) |

(52) U.S. Cl.

CPC ............. *H04N 7/162* (2013.01); *H04L 65/60* (2013.01); *H04N 21/242* (2013.01); *H04N 21/4302* (2013.01); *H04N 21/4307* (2013.01); *H04N 21/4331* (2013.01); *H04N 21/44016* (2013.01); *H04N 21/812* (2013.01); *H04N 21/8133* (2013.01); *H04N 21/8547* (2013.01); *Y02E 10/38* (2013.01)

(58) Field of Classification Search

CPC ................................ H04N 7/162; H04L 65/60

See application file for complete search history.

(56) References Cited

U.S. PATENT DOCUMENTS

| | | | |
|---|---|---|---|
| 2004/0073947 | A1 | 4/2004 | Gupta |
| 2004/0098754 | A1 | 5/2004 | Vella et al. |
| 2005/0166257 | A1 | 7/2005 | Feinleib et al. |
| 2007/0064095 | A1 | 3/2007 | Baartman |

FOREIGN PATENT DOCUMENTS

| | | | |
|---|---|---|---|
| EP | 0757485 | A2 | 2/1997 |
| WO | 02060178 | A1 | 8/2002 |

OTHER PUBLICATIONS

Extended European Search Report, dated Aug. 25, 2011 (8 pages).

*Primary Examiner* — Stephen S Hong
*Assistant Examiner* — Marshon L Robinson
(74) *Attorney, Agent, or Firm* — Fletcher Yoder, P.C.

(57) ABSTRACT

A system and method for disseminating digital content, including receiving a video stream having embedded time code markers, copying the video stream, distributing a first copy to a player with a desired delay, distributing a second copy for association of content, and associating content with the second copy during the delay for playing of the first copy and the associated content at the player.

20 Claims, 2 Drawing Sheets

Figure 1:
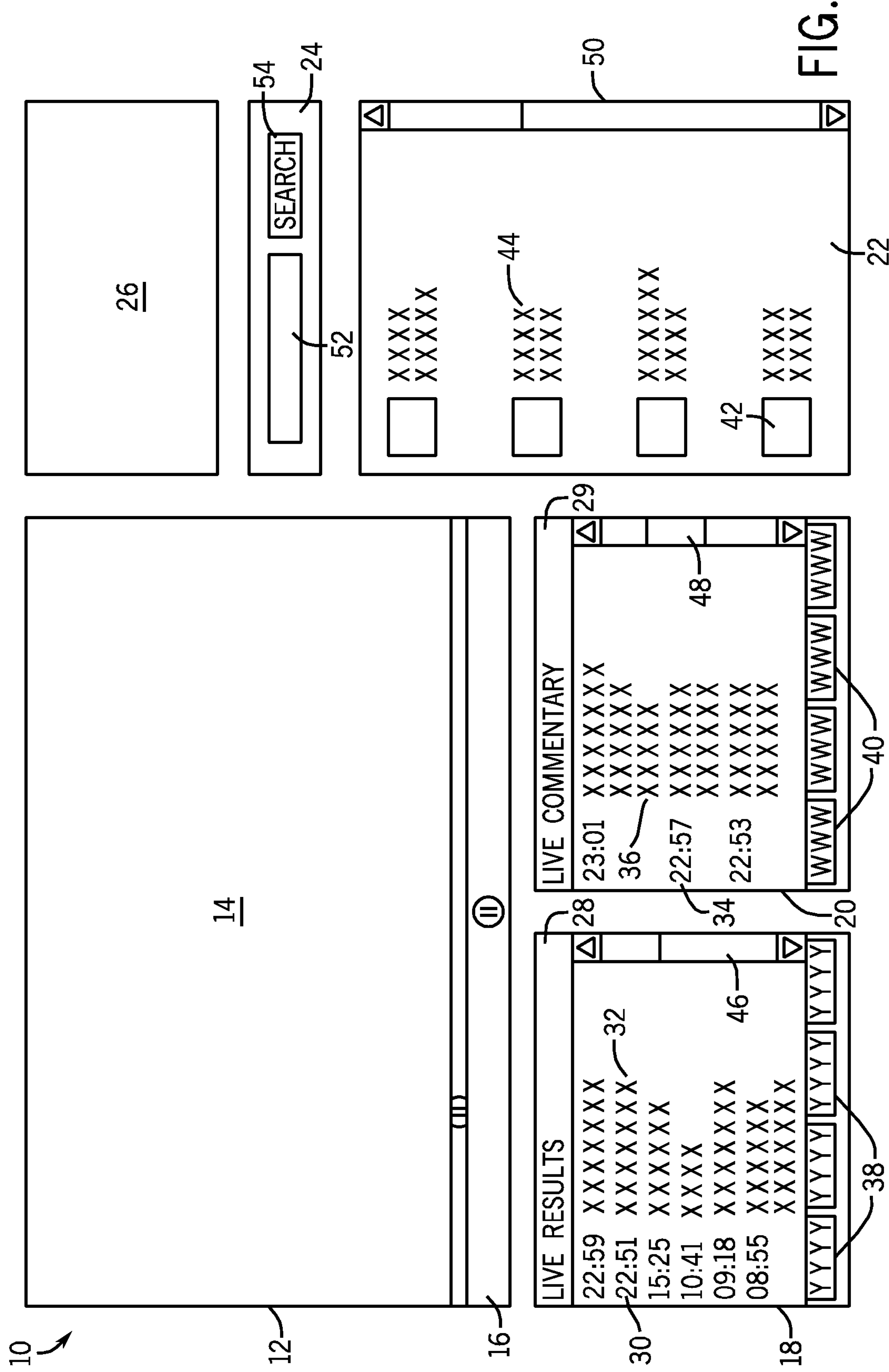

10
12
14
16
18
20
22
24
26
28
29
30
32
34
36
38
40
42
44
46
48
50
52
54
SEARCH
LIVE RESULTS
LIVE COMMENTARY
22:59
22:51
15:25
10:41
09:18
08:55
23:01
22:57
22:53

SYSTEM AND METHOD FOR PROVIDING DIGITAL CONTENT

CROSS REFERENCE TO RELATED APPLICATIONS

This application is a Continuation of Ser. No. 12/130,529, filed May 30, 2008, entitled "System and Method for Providing Digital Content", which is herein incorporated by reference.

BACKGROUND

The present invention relates generally to the field of providing digital content, and more particularly to managing and controlling the presentation of the provided digital content.

Many systems have been developed and are currently in use for providing digital content, such as movies, music, videos, text, and so forth. Such digital content may be supplied by a provider or holder (a supplier) of the content to a distributor or to the consumer, for example. There is an on-going need to more efficiently provide and distribute such content. Moreover, there is a desire to in the industry to more effectively provide digital content in substantially real time. In addition, there is desire to more efficiently and descriptively provide streaming video from many sources worldwide.

BRIEF DESCRIPTION

An aspect of the invention provides a method for disseminating digital content, including: receiving a video stream having embedded time code markers; copying the video stream; distributing a first copy to a player with a desired delay; distributing a second copy for association of content; and associating content with the second copy during the delay for playing of the first copy and the associated content at the player.

Another aspect of the invention provides a method for disseminating digital content, including: providing a first copy of a video stream having time code to a first controller; associating content with the first copy via the first controller; passing the content and a second copy of the video stream to a server; imposing a time delay in the second copy provided to the server; passing the content and a third copy of the video stream from the server to an end-user interface; and synchronizing the content with the third copy via the first controller and at least a second controller.

Yet another aspect of the invention includes a system for disseminating digital content, including: a video encoder configured to encode a video stream and to receive a time code; a first server configured to provide both a first video stream having the time code from the video encoder to a first controller and a second video stream having the time code from the video encoder to a second server; the second server configured to time delay the second video stream; and the first controller configured to associate content with the first video stream and to facilitate synchronization of the content with the second video stream.

DRAWINGS

Figure 2:
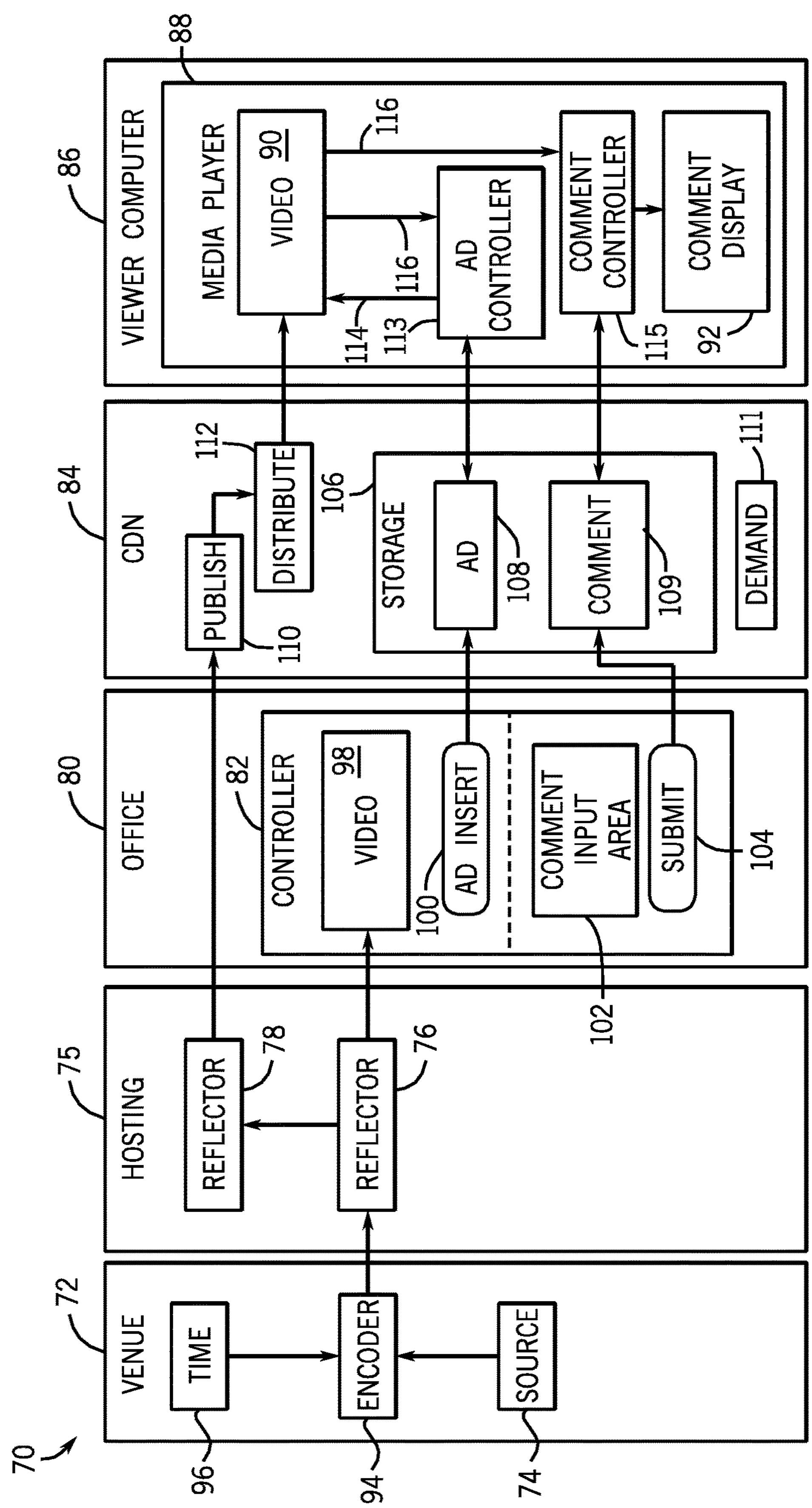

These and other features, aspects, and advantages of the present invention will become better understood when the following detailed description is read with reference to the accompanying drawings in which like characters represent like parts throughout the drawings, wherein:

FIG. 1 is a diagrammatical representation of an exemplary user-computer browser or display in accordance with aspects of the present invention; and FIG. 2 is a diagrammatical representation of an exemplary digital content delivery system in accordance with aspects of the present invention.

DETAILED DESCRIPTION

The present technique accommodates a supplier or distributor to offer digital content to an end-user (e.g., customer or consumer). The technique provides for an operator to manage the presentation of the digital content from a location remote from a source of the digital content. Such content may be distributed in substantially real time.

Again, the present technique is generally directed to disseminating digital content, such as audio, text, video, or audio-visual content, and so on. The digital content which may be streaming and/or progressive download. As discussed below, the technique may allow a provider or operator to remotely manage the presentation, format, and type of digital content provided to the end-user. For example, the layout (placement, size, graphics, shading, etc.) of the video, text, advertisements, and so forth, may be manipulated remotely from a source of the digital content.

In certain embodiments, the technique enables an operator to associate video advertisements, advertisement markers, text commentary, other markers, other content, and/or formatting changes, and so forth, with a live video stream from a location remote from the source of the video. Advantageously, the display of the video advertisements and text commentary, for example, may be synchronized with the live video, such that advertisements and text commentary appear to the end-user (e.g., consumer) at the intended time. As discussed below, time code markers may be inserted into the digital content (e.g., video stream) to facilitate coordination of the presentation to the end-user.

It should be noted that traditionally, the placement of advertisements generally entailed placing advertisement insertion hardware/operators at the video source being generated (e.g., at a remote venue such as a sporting event, news event, etc.) and inserting video advertisements directly into the stream. Moreover, text commentary that may be associated with video content has been typically handled separately from the video, without synchronization. In contrast, the present technique accommodates advertisement insertion at a location remote from the video source, as well as association (and synchronization) of commentary (i.e., text strings) with video (e.g., streaming video) from the video source.

Beneficially, the present technique may provide for avoiding expenditure of resources (e.g., time and money) associated with sending people to remote locations to capture the streaming video and to manage the presentation of the streaming video to the end-user. In addition, the technique may protect against the case where the text commentary is shown either too late or too early relative to the video content. In sum, the present technique facilitates the efficient and readily-available display of quality media content to the consumer.

As those skilled in the art will recognize, in the entertainment industry, certain entities will generally generate, create, or receive content, while these or other entities will distribute, sell, or otherwise provide the content to users. Throughout the present discussion, reference will be made to various entities, such as suppliers, companies, hosting entities, distributors, users, end-users, customers, consumers, and so on, as well as sites associated with digital content sources and destinations. However, in the present context, any or even all of these should be understood to be any person or entity that transmits or receives digital content. Moreover, it is not necessary for a content source to own the intellectual property rights relating to such content.

FIG. 1 depicts a media display 10 which may be a browser on a computer display, for example. In the illustrated embodiment, a video component (e.g., video player 12) having a video display 14 and controls 16 is positioned in the upper left corner of the display 10. The display 10 also includes two text boxes 18 and 20 in this example to display scrolling text. Further, in this example, the media display 10 includes a headline component 22, a search component 24, and an advertisement component 26. The text boxes 18 and 20 may have respective titles 28 and 29, such as "live results" and "live commentary." However, it should be emphasized that the depicted titles 28 and 29 are only exemplary, and also that the content presented in text boxes 18 and 20 is not limited to the current example.

In certain embodiments, the time 30 that the text 32 is entered in text box 18 is noted. Similarly, the time 34 that the text 36 is entered in text box 20 is noted. Moreover, text boxes 18 and 20 may also have tabs 38 and 40 for the end-user to select what is displayed in the text boxes 18 and 20 (which may change the titles 28 and 29). It should be noted that certain selected content or displays within the text boxes 18 and 20 may not incorporate the time 30 or 34, or the text 32 or 36. For example, in lieu of time 30 or 34, thumbnails of pictures or video may be displayed. In the illustrated example, thumbnails of video (e.g., headline videos) are positioned in the headline component 22. The headline component 22 includes thumbnails 42 and associated text 44. As should be apparent, the headline component 22 is only exemplary and may incorporate a wide variety of content in various formats, including content other than headlines and formats other than thumbnails. Lastly, the text boxes 18 and 20 and the headline component 22 may include scroll bars 46, 48, and 50 respectfully. The scroll bars 46, 48, and 50 may allow the user or viewer to scroll up and down to view different entries, thumbnails, and the like.

In this embodiment, the text box 18 for live results gives a general indication of results for various events. In contrast, the live commentary in text box 20 is associated with the content presented via the video player 12. Again, however, it should be emphasized that the subject matter and associations of the text and content presented is not meant to be limited by the illustrated example.

The search component 24 may include a text field 52 and a search button 54. However, other configurations for searches based on text or drop down menus, for example, may be implemented in the search component 24. The advertisement component 26 may be a static advertisement or a streaming advertisement, for example. The advertisement component 26 may also be a companion advertisement associated with the video presented (e.g., streaming) in the video display 14 of video player 12. On the other hand, the content of the advertisement component 26 being displayed may be only peripherally associated or independent of the video presented via video player 12. Moreover, as discussed below, a video advertisement may be presented in video display 14, such as with a commercial break of the primary video being presented in video display 14. Lastly, it should be noted that the present technique of remotely associating content (e.g., advertisement markers, text commentary, etc.) may be implemented without certain features such as search, navigation, companion advertisements, and the like.

FIG. 2 depicts a system 70 for providing digital content. The digital content may include any object supported by a mark-up language (e.g., hypertext mark-up language or HTML), supported by web application platforms accommodating non-mark-up languages, and so on. The digital content may be obtained and sent from a plurality of different sources. The digital content may include text, audio, video, or audio-visual content, or any combination thereof, and may be streaming or progressive download, or both.

The system 70 may include components at a venue 72 (e.g., remote venue) which may include a video source 74. In one example, the remote venue 72 is a sporting event. In another example, the venue 72 is a location of news-reporting event, and so on. The system 70 may also include reflectors 76 and 78 at a company hosting facility 75 for reproducing a copy of the video. The reflectors 76 and 78 may be one or more servers. In this example, the reflector 76 is an internal reflector to interface with components within the company or provider facility components. The reflector 78 is an external reflector to interface with an external network or distributor, for example, such as a content distribution network (CDN). Again, the reflectors 76 and 78 may generate a copy of video provided from the video source 74 or other sources at the remote venue 72. It should be noted that the reflectors 76 and 78 may be configured to receive and handle video or other content from multiple sources at the same time. Moreover, as discussed below, in certain embodiments, the external reflector 78 may be configured to impose a variable delay (e.g., 15 seconds, 20 seconds, 30 seconds, 45 seconds, etc.).

The system 70 may include components at a company office location 80, such as a controller 82 for implementing advertisement markers and insertion of the markers and advertisements, commentary input, format changes, and the like. Advertisements may include dynamic advertisements, companion advertisements, scrolling promotions, logos, etc. It should be noted that the referenced locations, such as the company hosting facility 75 and the company office location 80 are only exemplary, and that components of system 70 may be disposed at various locations and other types of facilities not specifically mentioned herein.

The system 70 may also incorporate components at a content distribution network (CDN) 84, which may be an external entity for distributing multiple copies of the video. Ultimately, the system 70 may include components at the end-user interface 86. The interface 86 may be a personal computer of a consumer or end-user at the home or office, for example. The interface 86 may include a media player 88 having a video display 90, which may correlate, for example, to the video player 12 and video display 14 of FIG. 1. In this example, the media player 88 includes a comment display area 92, which may correspond to text boxes 18 and 20 of FIG. 1.

The actual components and systems used in the present technique for delivery of digital content may be disposed in central and distributed locations. That is, a number of storage devices, servers, communications devices, and so forth, may be connected by a network and residing at various sites and places. Further, the network may include any range of network media and protocols, including conventional telephony connections, Internet connections, cabled and wireless connections, satellite connections, and so forth. Moreover, the content and data for provision of the content and regulation of its use may be communicated in accordance with any suitable protocol, such as the conventional TCP/IP protocol used for Internet communications. Moreover, the exemplary hardware configurations discussed herein are not meant to limit the technique. Indeed, the skilled artisan will recognize that a variety of hardware and software configurations may accommodate the content delivery systems of the present technique.

In operation of system 70, at the remote venue 72, a video or digital content source 74 may feed an encoder 94. The encoder 94 may translate baseband video to web-suitable video, for example. The encoder 94 may shrink or compress the video or other digital content from the video source 74 and other sources. Further, at the venue 72, a time code injection service 96 may inject the time into the video encoder to be paired with the video source or feed at a desired frequency, such as every second. The absolute injected time may be based on a selected time zone, such as Greenwich Mean Time (GMT), or any other desirable time zone or time reference. As discussed below, the injected time or time stamp may provide part of a basis for synchronizing advertising and commentary content (as well as formatting changes, content changes, etc.) with the video displayed at the end-user interface 86.

The output of the encoder 94 may feed the encoded video including the time code or stamp from the time injection service 72 to the internal reflector 76. The internal reflector 76 may then feed both the external reflector 78 within the company hosting facility 75 and a video component 98 of the controller 82 at the company office location 80, and so forth. To accommodate the insertion of additional content along with the original video, the controller 82 at the company office facility 80 may include an advertisement insert button 100, a commentary input area 102, a commentary submit button 104, and the like.

Downstream, the content distribution network 84 (CDN) may include a storage 106 having an advertisement component 108 and a commentary component 109. The advertisement component 108 may store advertisement manifest files, a list of time codes, and the like. The commentary component 109 may store commentary manifest files and a list of time codes and associated comment text strings, for example. The CDN 84 may include a publishing point 110 (e.g., reflectors) and a plurality of distribution servers 112. The publishing point 110 may receive a copy of the video or digital content from the external reflector 78 of the hosting facility 75. The publishing point 110 may then feed multiple copies of the digital content to distribution servers 112 for dissemination to the various end-users, such as an end-user at an interface (viewer computer) 86. Further, the CDN 84 may provide for on-demand play of past recorded video stored at the CDN 84, as indicated by reference numeral 111. Lastly, it should be noted that present technique may bypass the CDN 84 or utilize a subsystem other than a CDN 84 to publish and/or distribute content. Such a subsystem may include, for example, one or more servers, storages, etc.

The media player 88 may include an advertisement controller 113 and a commentary controller 115. The advertisement controller 113 may trigger an advertisement play into the video display 90, as indicated by reference numeral 114, via insertion of markers or calls based on timing into the media player 88. The advertisement controller 113 or media player 88 may call out to a server (e.g., external server), for example, to retrieve advertisement content based on the inserted markers and timing.

The display of the advertisement may occur in the video display (e.g., video display 14 of FIG. 1) and may be temporally positioned at a desired timing, such as with a break or stoppage of the primary video being displayed. On the other hand, the advertisement may be timed at any time including an imposed interruption of the primary video content. In all, the advertisement may be dynamically stitched in a video display 90 and/or associated browser, for example, at the interface 86. Moreover, the video play back component 90 may also broadcast a current time code to the advertisement controller 113 and/or the commentary controller 115, as indicated by reference numeral 116, to facilitate the timing of the display of the advertisements and commentary. It should be noted that controllers 113 and 115, as well as additional controllers disposed at the interface 86, may be configured to provide for content other than advertisements or commentary, and also to provide for format changes of the display 88, for example.

As mentioned, a beneficial aspect of the present technique is to introduce a delay in one or more of the media servers (e.g., at reflector 78) that sits between the encoder 94 at the venue 72 and the consumer or end-user at the viewer interface 86. A configurable delay (e.g., 20 seconds) may be imposed to provide additional time for the operator at the controller 82 to insert advertisements and/or advertisement markers or calls, type commentary, input timing, make format changes, and so forth, and to synchronize such content or changes with the video viewed by the consumer at display 90. Moreover, in addition to any imposed delay, there is typically natural delay (e.g., 5-30 seconds and which may be highly variable) as a result of the video being served via a content distribution network (e.g., CDN 84). Natural delay (e.g., 5 seconds) may occur between the video encoder 94 and the internal reflector 76. In the internal path, additional natural delay (e.g., 5 seconds) may occur between the internal reflector 76 and the video display 98 at the operator controller 82. In the external path, natural delay may occur between the external reflector 78 and the publishing point 110 of the CDN 84, between the publishing point 110 and the distribution servers 112, and between the distribution servers 112 and the video display 90 at the consumer interface 86.

Again, the actual amount of natural delay at each path or point may be highly variable. With the assumption of an exemplary 5 second delay at each point, the natural delay through the internal path is 10 seconds. Thus, the operator viewing the video stream (from video source 74) at the video display 98 at the company office location 80 views the video about 10 seconds delayed from live. The natural delay through the external path in this example is about 20 seconds, a 10 second difference with the internal path. This exemplary 10 second difference in natural delay gives the operator at controller 82 more advance time in addition to the configurable delay imposed at the external reflector 78. It should be emphasized that the numerical values of time discussed herein for natural delay are only exemplary, and in normal operation, may vary (e.g., 1 second to 30 seconds at each point) over time and from point to point.

Again, as discussed, a time code is injected (via time injection service 96 in the example of FIG. 2) into the video stream (of video source 74 at encoder 94), such as the time at a particular time zone (e.g., GMT). Thus, the video player 88 at the end-user interface 86 responds substantially exactly to the time (e.g., in GMT) that corresponds to the video being played in the video display 90 of the media player 88. In operation, advertisement insertion operators and commentators (e.g., at the company office facility 80) may watch a video stream, for example, via a different media server, which generally does not have a delay (e.g., at video display 98 from internal reflector 76). As indicated, in certain embodiments, this video viewed by the operator also does not go through the content distribution network (e.g., CDN 84). Thus, because of typical normal delay and any imposed delay of the other video stream passed through the external reflector 78 to CDN 84 and ultimately to the end-user interface 86, the operators watching the video about 15 to 45 seconds in advance of the end-user or consumer (e.g., at interface 86).

In sum, the operators may employ this advance in time to insert advertisement insertion markers and type text commentary, for example, both of which show up in the video player 88 before the video content with which they are associated. This allows ample time to buffer video advertisements and fetch information related to the commentary, before being displayed in the video display 90 to be viewed by the consumer. Further, the display of these advertisements and commentary (and other content or formatting manipulation) may be synchronized to the approximate or substantially exact point in time at which the operator intended.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A processor-implemented method for disseminating digital content, comprising:

receiving, at the processor, a video stream;

distributing, at the processor, a distribution copy of the video stream to a player with an association delay, the association delay being imposed before the distribution copy is received by the player; and distributing, without the association delay, an association copy of the video stream to an entity tasked with associating related content, video stream changes, or both with the video stream, enabling the entity to associate the related content with the video stream during the association delay, such that the related content, video stream changes, or both may be synchronized with playback of the distribution copy.

2. The method of claim 1, comprising:

associating, via the entity, the related content, the video stream changes, or both with the video stream by:

associating the related content, the video stream changes, or both with the association copy during the association delay; wherein associating the related content, the video stream changes, or both with the association copy comprises synchronizing the related content, the video stream changes, or both with a timing of the association copy; and providing the association to the player.

3. The method of claim 2, comprising:

associating the related content, the video stream changes, or both with the video stream by associating the related content, the video stream changes, or both with the association copy during the association delay, based upon time references embedded in the video stream and the association copy.

4. The method of claim 2, comprising associating the related content with the association copy, wherein associating the related content with the association copy comprises associating an advertisment, an advertisment marker, an advertisment call, commentary data, results data, or any combination thereof with the association copy.

5. The method of claim 2, comprising associating the video stream changes with the association copy, wherein associating the video stream changes with the association copy comprises associating a formatting change, layout change, or both with the association copy.

6. The method of claim 2, comprising:

playing the distribution copy and the related content at a syncronized time, based upon the provided association of the distribution copy and the associated content at the player.

7. The method of claim 2, wherein associating the related content, the video stream changes, or both with the association copy comprises associating the related content, the video stream changes, or both with the association copy at a location that is remote from a source of the video stream.

8. The method of claim 1, wherein a desired time for the association delay is configurable.

9. The method of claim 1, comprising injecting a time code into the video stream.

10. A tangible, non-transitory, machine-readable medium, comprising machine-readable instructions that, when executed by one or more processors, cause the one or more processors to:

receive a video stream;

distribute a distribution copy of the video stream to a player with an association delay, the association delay being imposed before the distribution copy is received by the player; and distribute, without the association delay, an association copy of the video stream to an entity tasked with associating related content, video stream changes, or both with the video stream, enabling the entity to associate the related content with the video stream during the association delay, such that the related content, video stream changes, or both may be synchronized with playback of the distribution copy.

11. The machine-readable medium of claim 10, comprising machine-readable instructions, that when executed by the one or more processors, cause the one or more processors to:

associate, via the entity, the related content, the video stream changes, or both with the video stream by:

associating the related content, the video stream changes, or both with the association copy during the association delay; wherein associating the related content, the video stream changes, or both with the association copy comprises synchronizing the related content, the video stream changes, or both with a timing of the association copy; and providing the association to the player.

12. The machine-readable medium of claim 11, comprising machine-readable instructions, that when executed by the one or more processors, cause the one or more processors to:

associate the related content, the video stream changes, or both with the video stream by associating the related content, the video stream changes, or both with the association copy during the association delay, based upon time references embedded in the video stream and the association copy.

13. The machine-readable medium of claim 11, comprising machine-readable instructions, that when executed by the one or more processors, cause the one or more processors to:

associate the related content with the association copy, wherein associating the related content with the association copy comprises associating an advertisment, an advertisment marker, an advertisment call, commentary data, results data, or any combination thereof with the association copy.

14. The machine-readable medium of claim 11, comprising machine-readable instructions, that when executed by the one or more processors, cause the one or more processors to:

associate the video stream changes with the association copy, wherein associating the video stream changes with the association copy comprises associating a formatting change, layout change, or both with the association copy.

15. The machine-readable medium of claim 11, comprising machine-readable instructions, that when executed by the one or more processors, cause the one or more processors to:

play the distribution copy and the related content at a syncronized time, based upon the provided association of the distribution copy and the associated content at the player.

16. The machine-readable medium of claim 11, wherein associating the related content, the video stream changes, or both with the association copy comprises associating the related content, the video stream changes, or both with the association copy at a location that is remote from a source of the video stream.

17. A computer system, comprising:

one more network communications devices communicatively coupling the computer system with a content player system and an association system; and a processor, configured to:

receive a video stream;

distribute, via the one or more network communications devices, a distribution copy of the video stream to the content player system with an association delay, the association delay being imposed before the distribution copy is received by the content player system; and distribute, without the association delay, via the one or more network communications devices, an association copy of the video stream to an the association system, wherein the association system is tasked with associating related content, video stream changes, or both with the video stream, enabling the association system to associate the related content with the video stream during the association delay, such that the related content, video stream changes, or both may be synchronized with playback of the distribution copy.

18. The computer system of claim 17, comprising the association system, wherein the association system is configured to associate the related content, the video stream changes, or both with the video stream by:

associating the related content, the video stream changes, or both with the association copy during the association delay; wherein associating the related content, the video stream changes, or both with the association copy comprises synchronizing the related content, the video stream changes, or both with a timing of the association copy; and providing the association to the content player system.

19. The computer system of claim 18, wherein the association system is configured to:

associate the related content, the video stream changes, or both with the video stream by associating the related content, the video stream changes, or both with the association copy during the association delay, based upon time references embedded in the video stream and the association copy.

20. The method of claim 1, comprising imposing, via the processor, the association delay in the distribution copy prior to the distribution copy being received by the player.

* * * * *